(12) United States Patent
Mia

(10) Patent No.: US 8,204,511 B2
(45) Date of Patent: *Jun. 19, 2012

(54) MID-CALL SYNCHRONIZATION FOR U-TDOA AND AOA LOCATION IN UMTS

(75) Inventor: Rashidus S. Mia, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,780

(22) Filed: Jun. 29, 2011

(65) Prior Publication Data

US 2011/0256887 A1    Oct. 20, 2011

Related U.S. Application Data

(63) Continuation of application No. 11/956,193, filed on Dec. 13, 2007.

(51) Int. Cl.
H04W 24/00    (2009.01)
(52) U.S. Cl. ............ 455/456.1; 342/357.43; 342/357.64
(58) Field of Classification Search .................. 455/456; 370/338
See application file for complete search history.

(56) References Cited

U.S. PATENT DOCUMENTS

| | | | |
|---|---|---|---|
| 5,327,144 | A | 7/1994 | Stilp et al. |
| 6,047,192 | A | 4/2000 | Maloney et al. |
| 6,388,618 | B1 | 5/2002 | Stilp et al. |
| 6,563,884 | B1 | 5/2003 | Nikula |
| 6,782,264 | B2 | 8/2004 | Anderson |
| 2005/0014516 | A1 | 1/2005 | Rached et al. |
| 2006/0003775 | A1 | 1/2006 | Bull |
| 2006/0030333 | A1 | 2/2006 | Ward et al. |
| 2006/0217088 | A1 | 9/2006 | Nagaoka |
| 2007/0111746 | A1 | 5/2007 | Anderson |
| 2007/0161385 | A1 | 7/2007 | Anderson |
| 2009/0124266 | A1 | 5/2009 | Carlson et al. |

OTHER PUBLICATIONS

3GPP Technical Specifications 25.201, "Physical Layer on the Radio Path: General Description", downloaded 2008, 3 pages.
3GPP Technical Specifications 25.213, "Spreading and Modulation (FDD)", downloaded 2008, 3 pages.
3GPP Technical Specification 25.211, "Physical Channels and Mapping of Transport Channels onto Physical Channels (FDD)", downloaded 2008, 4 pages.
3GPP Technical Specification 25.430, "UTRAN Iub Interface: General Aspects and Principles", downloaded 2008, 3 pages.
3GPP Technical Specification 25.450, "UTRAN Iupic Interface General Aspects and Principles", downloaded 2008, 2 pages.
3GPP Technical Specification 25.305, "Stage 2 Functional Specification of User Equipment (UE) Positioning in UTRAN", downloaded 2008, 3 pages.
3GPP Technical Specification 22.071, "Location Services (LCS) Service Description: Stage 1", downloaded 2008, 3 pages.

*Primary Examiner* — Marcos Batista
(74) *Attorney, Agent, or Firm* — Woodcock Washburn LLP

(57) ABSTRACT

In a wireless location system, a method for determining frame and slot timing information for use in receiving an uplink signal from a user equipment (UE) device assigned to an uplink Dedicated Physical Control Channel (DPCCH) includes receiving signals in the uplink DPCCH at a location measurement unit (LMU) of the WLS. The method also includes detecting a predefined bit pattern known to be present in a plurality of predefined slots of the uplink DPCCH. Next, the frame and slot timing information are determined for the uplink DPCCH based on the detected bit pattern. Finally, the frame and slot timing information is used for collecting uplink signals from the UE for use in location processing.

22 Claims, 4 Drawing Sheets

Table 3: Pilot bit patterns for uplink DPCCH with $N_{pilot}$ = 3, 4, 5 and 6

| Slot# \ Bit # | $N_{pilot}$=3 | | | $N_{pilot}$=4 | | | | $N_{pilot}$=5 | | | | | $N_{pilot}$=6 | | | | | |
|---|---|---|---|---|---|---|---|---|---|---|---|---|---|---|---|---|---|---|
| | 0 | 1 | 2 | 0 | 1 | 2 | 3 | 0 | 1 | 2 | 3 | 4 | 0 | 1 | 2 | 3 | 4 | 5 |
| → 0 | 1 | 1 | 1 | 1 | 1 | 1 | 1 | 1 | 1 | 1 | 1 | 0 | 1 | 1 | 1 | 1 | 1 | 0 |
| 1 | 0 | 0 | 1 | 1 | 0 | 0 | 1 | 0 | 0 | 1 | 1 | 0 | 1 | 0 | 0 | 1 | 1 | 0 |
| 2 | 0 | 1 | 1 | 1 | 0 | 1 | 1 | 0 | 1 | 1 | 0 | 1 | 1 | 0 | 1 | 1 | 0 | 1 |
| 3 | 0 | 0 | 1 | 1 | 0 | 0 | 1 | 0 | 0 | 1 | 0 | 0 | 1 | 0 | 0 | 1 | 0 | 0 |
| 4 | 1 | 0 | 1 | 1 | 1 | 0 | 1 | 1 | 0 | 1 | 0 | 1 | 1 | 1 | 0 | 1 | 0 | 1 |
| → 5 | 1 | 1 | 1 | 1 | 1 | 1 | 1 | 1 | 1 | 1 | 1 | 0 | 1 | 1 | 1 | 1 | 1 | 0 |
| → 6 | 1 | 1 | 1 | 1 | 1 | 1 | 1 | 1 | 1 | 1 | 0 | 0 | 1 | 1 | 1 | 1 | 0 | 0 |
| 7 | 1 | 0 | 1 | 1 | 1 | 0 | 1 | 1 | 0 | 1 | 0 | 0 | 1 | 1 | 0 | 1 | 0 | 0 |
| 8 | 0 | 1 | 1 | 1 | 0 | 1 | 1 | 0 | 1 | 1 | 0 | 1 | 1 | 0 | 1 | 1 | 0 | 1 |
| → 9 | 1 | 1 | 1 | 1 | 1 | 1 | 1 | 1 | 1 | 1 | 1 | 1 | 1 | 1 | 1 | 1 | 1 | 1 |
| 10 | 0 | 1 | 1 | 1 | 0 | 1 | 1 | 0 | 1 | 1 | 0 | 1 | 1 | 0 | 1 | 1 | 0 | 1 |
| 11 | 1 | 0 | 1 | 1 | 1 | 0 | 1 | 1 | 0 | 1 | 1 | 1 | 1 | 1 | 0 | 1 | 1 | 1 |
| 12 | 1 | 0 | 1 | 1 | 1 | 0 | 1 | 1 | 0 | 1 | 0 | 0 | 1 | 1 | 0 | 1 | 0 | 0 |
| 13 | 0 | 0 | 1 | 1 | 0 | 0 | 1 | 0 | 0 | 1 | 1 | 1 | 1 | 0 | 0 | 1 | 1 | 1 |
| 14 | 0 | 0 | 1 | 1 | 0 | 0 | 1 | 0 | 0 | 1 | 1 | 1 | 1 | 0 | 0 | 1 | 1 | 1 |

Table 4: Pilot bit patterns for uplink DPCCH with $N_{pilot}$ = 7 and 8

| Slot# \ Bit # | $N_{pilot}$=7 | | | | | | | $N_{pilot}$=8 | | | | | | | |
|---|---|---|---|---|---|---|---|---|---|---|---|---|---|---|---|
| | 0 | 1 | 2 | 3 | 4 | 5 | 6 | 0 | 1 | 2 | 3 | 4 | 5 | 6 | 7 |
| → 0 | 1 | 1 | 1 | 1 | 1 | 0 | 1 | 1 | 1 | 1 | 1 | 1 | 1 | 1 | 0 |
| 1 | 1 | 0 | 0 | 1 | 1 | 0 | 1 | 1 | 0 | 1 | 0 | 1 | 1 | 1 | 0 |
| 2 | 1 | 0 | 1 | 1 | 0 | 1 | 1 | 1 | 0 | 1 | 1 | 1 | 0 | 1 | 1 |
| 3 | 1 | 0 | 0 | 1 | 0 | 0 | 1 | 1 | 0 | 1 | 0 | 1 | 0 | 1 | 0 |
| 4 | 1 | 1 | 0 | 1 | 0 | 1 | 1 | 1 | 1 | 1 | 0 | 1 | 0 | 1 | 1 |
| → 5 | 1 | 1 | 1 | 1 | 1 | 0 | 1 | 1 | 1 | 1 | 1 | 1 | 1 | 1 | 0 |
| → 6 | 1 | 1 | 1 | 1 | 0 | 0 | 1 | 1 | 1 | 1 | 1 | 1 | 0 | 1 | 0 |
| 7 | 1 | 1 | 0 | 1 | 0 | 0 | 1 | 1 | 1 | 1 | 0 | 1 | 0 | 1 | 0 |
| 8 | 1 | 0 | 1 | 1 | 0 | 0 | 1 | 1 | 0 | 1 | 1 | 1 | 0 | 1 | 0 |
| → 9 | 1 | 1 | 1 | 1 | 1 | 1 | 1 | 1 | 1 | 1 | 1 | 1 | 1 | 1 | 1 |
| 10 | 1 | 0 | 1 | 1 | 0 | 1 | 1 | 1 | 0 | 1 | 1 | 1 | 0 | 1 | 1 |
| 11 | 1 | 1 | 0 | 1 | 1 | 1 | 1 | 1 | 1 | 1 | 0 | 1 | 1 | 1 | 1 |
| 12 | 1 | 1 | 0 | 1 | 0 | 0 | 1 | 1 | 1 | 1 | 0 | 1 | 0 | 1 | 0 |
| 13 | 1 | 0 | 0 | 1 | 1 | 1 | 1 | 1 | 0 | 1 | 0 | 1 | 1 | 1 | 1 |
| 14 | 1 | 0 | 0 | 1 | 1 | 1 | 1 | 1 | 0 | 1 | 0 | 1 | 1 | 1 | 1 |

FIG. 3

MID-CALL SYNCHRONIZATION FOR U-TDOA AND AOA LOCATION IN UMTS

This application is a continuation of U.S. application Ser. No. 11/956,193, filed Dec. 13, 2007, currently pending, which is hereby incorporated by reference in its entirety.

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to the discovery of W-CDMA radio signaling timing while in mid-call, in a wireless location system (WLS).

BACKGROUND

A presently preferred implementation of the inventive subject matter described herein is especially suited for synchronization of an uplink time difference of arrival (U-TDOA) wireless location system, or a hybrid system employing U-TDOA and angle of arrival (AoA) location technologies. Such systems may be used in connection with wireless communication systems employing spread spectrum techniques and rely on the uplink radio path between a user equipment (UE) device in the active state and a UMS base station (Node B) for the collection of radio signals, which are then used for TDOA and/or TDOA/AoA location calculations.

Code Division Multiple Access (CDMA) is a now common method for transmission of voice and data over radio. TruePosition was a pioneer in location of CDMA mobiles when in the year 2000, it conducted extensive testing with Verizon Wireless in mid-town Manhattan, N.Y. Verizon Laboratories used the rigorous test plan published by the CDMA Development Group (CDG) to determine the performance of TruePosition's network-based location technology in the challenging urban canyon (10 to 25 story buildings) environment. The WLS demonstrated sub-100 meter location results in a variety of indoor, outdoor, pedestrian, and moving vehicle scenarios. In the trial, unmodified CDMA (IS-95) mobile phones were used to make more than 30,000 test calls. These calls were placed by both Verizon Labs (formerly GTE Labs) and TruePosition in an area covered by 30 cell sites hosting time difference of arrival (TDOA) receivers.

The inventive techniques and concepts described herein apply to code-division radio communications systems, including the technologies referred to in technical specifications as CDMAOne (TIA/EIA IS-95 CDMA with IS-95A and IS-95B revisions), CDMA2000 family of radio protocols (as defined by the 3rd Generation Partnership Project 2 (3GPP2)), and in the Wideband Code-Division Multiple-Access (W-CDMA) radio system defined by the 3rd Generation Partnership Project (3GPP) as part of the Universal Mobile Telephone System (UMTS). The UMTS model discussed herein is an exemplary but not exclusive environment in which the present invention may be used. FIG. 1 depicts exemplary UMTS environment in which the present invention may be employed. These are explained in greater detail below.

To date, the UMTS option using the Frequency Division Duplex (FDD mode) of Wideband Code Division Multiple Access (W-CDMA) as the underlying air interface has been most widely deployed. Frequency Division Duplex is employed in UMTS to provide an uplink and downlink radio channel between the network and the user. The uplink and downlink frequencies are assigned and use separate spectral bands. FDD UMTS transceivers must tune between the uplink and downlink frequencies to transmit and receive, respectively. W-CDMA is a direct sequence spread spectrum system where base stations are not synchronized. Asynchronous base stations and thus asynchronous radio signaling requires mobile devices to acquire a timing reference and to synchronize to a base station (a Node B in UMTS) before communications can commence. In a UMTS, FDD, W-CDMA-based, system, the mobile device receives the Broadcast Channel (BC) from the base station (called the Node B in UMTS) to acquire the rough timing needed to access the Reverse Access Channel (RACH). This acquisition and synchronization procedure is called a "cell search".

UMTS Frame and Slot Synchronization

In a W-CDMA system, the primary and secondary synchronization downlink (Node B to UE) channels (P-SCH, S-SCH) provide radio frame and time slot synchronization. The basic unit of time in UMTS radio signals is a 10 millisecond (ms) radio frame, which is divided into 15 slots of 2560 chips each. UMTS radio signals from a Node B to a UE are "downlink signals," while radio signals in the reverse direction are called "uplink signals." This structure is depicted in FIG. 2 and explained in greater detail below.

For each UE, initial cell search algorithms are used to synchronize the UE to a Node B. The UE accomplishes this procedure via a common downlink channel called the physical synchronization channel (PSCH).

When a UE is first powered on, the UE performs a cell search. In the cell search, the UE looks first for a downlink synchronization channel (SCH). The SCH is a common downlink channel transmitted from the cell allowing UE's within the radio footprint of the cell to synchronize at the slot and frame levels and to determine the particular scrambling code group of the cell. As specified in technical specifications for the UMTS standards, the downlink synchronization channel (DL-SCH or just SCH) is a sparse downlink channel that is only active during the first 256 chips of each slot. The SCH is made up of two sub-channels, the Primary SCH (PSCH) and the Secondary SCH (SSCH). The PSCH 256 chip sequence, or PSCH code, is the same in all slots of the SCH for all cells. In contrast, the SSCH 256 chip sequence, or SSCH code, may be different in each of the 15 slots of a radio frame and is used to identify one of 64 possible scrambling code groups. In other words, each radio frame of the SCH repeats a scrambling code group sequence associated with the respective transmitting cell. Each SSCH code is taken from an alphabet of 16 possible SSCH codes.

As part of the cell search, the UE first uses the PSCH to achieve slot synchronization. In this regard, the UE correlates received samples of the received PSCH against the known PSCH 256 chip sequence (which is the same for all slots) and, based on the location of the correlation peak, determines a slot reference time. Once the slot reference time is determined, the UE is slot synchronized and can determine when each slot starts in a received radio frame.

After slot synchronization, the UE ceases processing of the PSCH and begins processing the SSCH. In particular, the UE correlates the particular sequence of 15 SSCH codes in a received radio frame against known sequences to achieve frame synchronization and to determine the scrambling code group of the cell. Identification of the scrambling code group then enables the UE to descramble all of the other downlink channels of the cell such as the Common Pilot Channel (CPICH)) necessary for UMTS voice/data communications to begin.

The now synchronized UE can then move to the active state and access the uplink Random Access Channel. The Random Access Channel (RACH) is an uplink transport channel. The RACH is always received from the entire cell. The RACH is characterized by a collision risk and by being transmitted using open loop power control. While on the RACH, the UE sends a long pilot sequence allowing the Node B to determine the UE's time alignment. Once the UE has moved to the conversation stage of a call and is assigned to a DPCCH, pilot sequences transmitted by the UE are used to maintain the timing alignment. A total of 3 to 8 bits per slot are used for the mid-call uplink pilot sequences with 15 (0 to 14) slots available per frame. (As known to those of skill in the field of wireless communications, the term "DPCCH" stands for Dedicated Physical Control Channel. The DPCCH is the physical channel on which the signaling is transmitted, both on the uplink by the UE to the Node-B base transceiver station and on the downlink by the Node-B to the UE.)

The purpose of the time slot structure in UMTS is to provide a timing framework for determining when various events can occur. For example, a user's data rate can change for every frame, and power control commands are sent every slot (thus giving WCDMA a power control rate of 1,500 Hz). The data in WCDMA is modified by both spreading and scrambling codes prior to transmission. De-scrambling and de-spreading the received spread spectrum signal requires accurate alignment of the received data to the de-scrambling/de-spreading codes. If the WLS is tasked mid-call via the Iub or LMS, and therefore has no knowledge of the RACH bursts made by the UE, and since the power control of the W-CDMA system precludes inexpensive broadcast channel monitoring, the WLS is presented with a problem in collecting uplink signals from the UE for location purposes. As explained below, the present invention addresses this problem.

SUMMARY

The following summary provides a high level overview of the inventive methods and systems described herein. This summary is by no means intended to cover all of the inventive subject matter described in greater detail below, nor is it intended to limit the scope of protection of the claims appearing at the end of this specification.

The present invention allows for mid-call synchronizing of the WLS receivers to the uplink frame and slot(s) used by the mobile-to-be-located without downlink monitoring. The latency of the mid-call synchronization can be shortened by giving the WLS additional coherency (known bit patterns), but a method has been found that may be used with no such information. In one illustrative example, in a wireless location system, a method for determining frame and slot timing information for use in receiving an uplink signal from a user equipment (UE) device assigned to an uplink Dedicated Physical Control Channel (DPCCH) includes receiving signals in the uplink DPCCH at a location measurement unit (LMU) of the WLS. The method also includes detecting a predefined bit pattern known to be present in a plurality of predefined slots of the uplink DPCCH. Next, the frame and slot timing information are determined for the uplink DPCCH based on the detected bit pattern. Finally, the frame and slot timing information is used for collecting uplink signals from the UE for use in location processing.

Other aspects of the inventive methods and systems are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3 shows the UMTS pilot sequences available for mid-call synchronization.

DETAILED DESCRIPTION OF ILLUSTRATIVE EMBODIMENTS

We will now describe illustrative embodiments of the present invention. First, we provide an overview and then a more detailed description, including a discussion of the problem addressed by the invention and the inventive solutions.

Overview

Without access to the rough timing information provided to the UE via the broadcast channel and without the fine timing developed from the uplink RACH pilot sequence, a WLS may be required to exploit a multi-frame, multi-slot pilot examination procedure to develop timing to allow reception of the uplink signaling from the mobile of interest for the calculation of the uplink time difference of arrival. As described in 3GPP specification 3GPP TS 25.211, "Physical channels and mapping of transport channels onto physical channels. (FDD)", the number of Pilot Bits included in the DPCCH can vary from 3 to 8 per slot. The pilot sequence also varies based on the slot format selected by the network for data bandwidth and quality of service purposes. If the slot format is known to the WLS a priori, a multi-slot, multi-frame detection procedure can be used, taking advantage of the coherent detection processing gain resulting from the known pilot sequence. This procedure will allow the WLS to determine the uplink radio timing.

Once the frame and slot timing are known, capture of the uplink signal by the local LMU can occur and a TDOA and/or TDOA/AoA hybrid location developed using techniques described in other patents owned by TruePosition, Inc., the assignee of the present invention.

If the slot format and thus the number of pilot bits are not known to the WLS, use of the full pilot bit sequence for coherent detection and determination of frame start cannot be accomplished. However, an alternative method, where the slot format is not known to the WLS a priori, can be used. This alternative method relies on the fact that the first 3 bits for slots 0, 5, 6, and 9 do not change regardless of the number of Pilot Bits used per slot. By confining the examination of the pilot bits to first 3 bits, the WLS can take advantage of the coherent detection and detect the slot format from these pilot bits.

We will now describe several exemplary environments in which the present invention may be deployed.

Overlay WLS Environments

Figure 1:
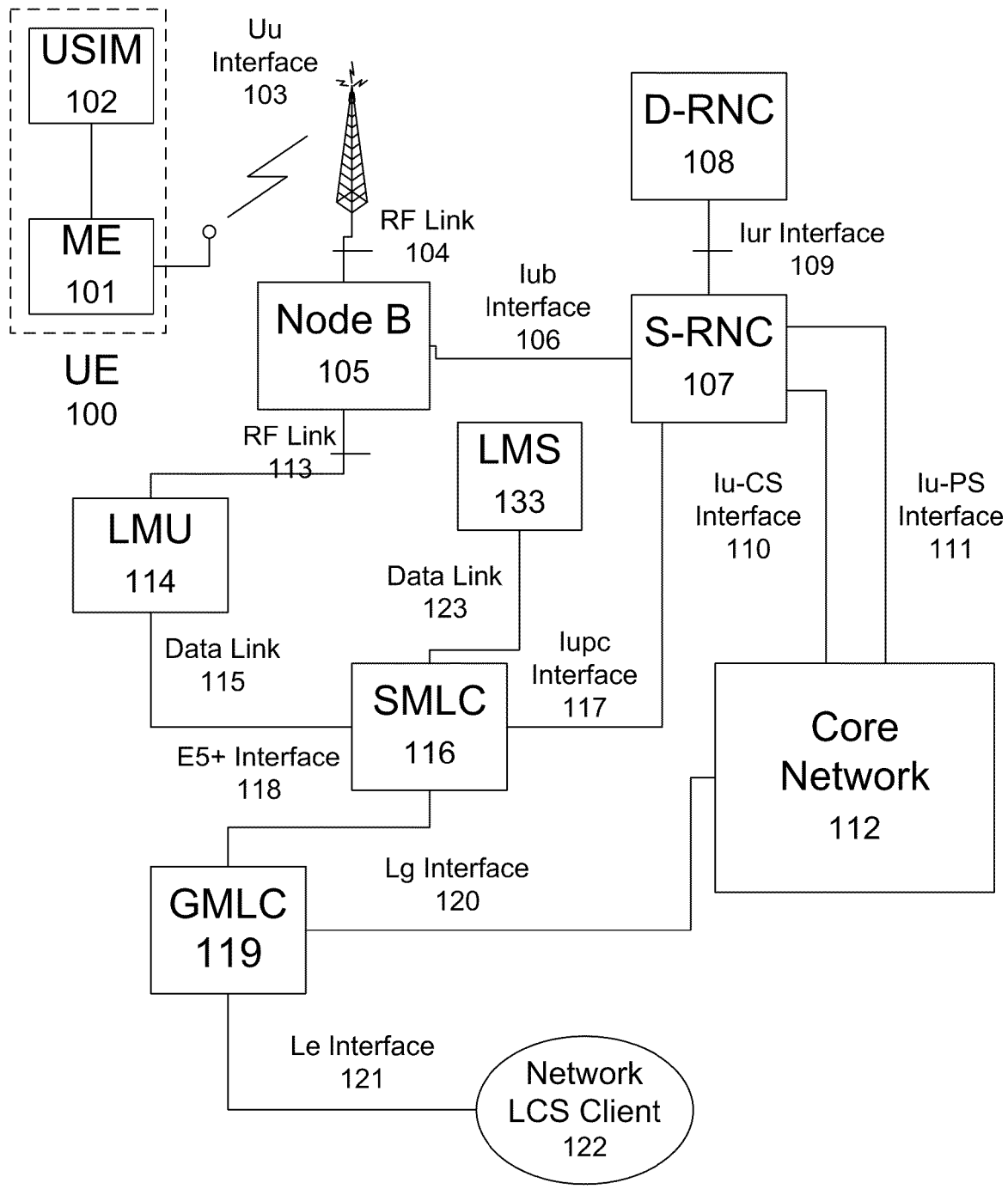
FIG. 1 schematically depicts a UMTS Radio Access Network incorporating a U-TDOA or U-TDOA/AoA Wireless Location System as standardized by 3GPP with improvements.

FIG. 1 is illustrative of the wireless communications networks that the present invention functions within. While the following subsections describe exemplary implementations of the communications system as a UMTS, IS-95 and CDMA2000 cellular communication systems, the teachings of the present invention are analogously also applicable to other wideband, spread spectrum packet radio communication systems that are implemented in other manners.

FIG. 1

FIG. 1 shows the architecture of an illustrative UMTS network reference model.

UE (100)

The UMTS UE (User Equipment) 100 is the logical combination of the ME (Mobile Equipment) 101 and SIM/USIM (Subscriber Identity Module/UMTS Subscriber Identity Module) 102. The UE is the formal name for the UMTS handset or mobile.

ME (101)

The Mobile Equipment (ME) 101 is the hardware element of a mobile station and comprises of keyboard, screen, radio, circuit boards and processors. The ME processors support both communications signal processing and processing of various UE-based services that may include a UE-based LCS Client application.

USIM (102)

The USIM (UMTS Subscriber Identity Module) 102, also referred to as a SIM card, is a programmable memory device what holds the user subscription information to the UMTS mobile network. The USIM contains relevant information that enables access onto the subscribed operator's network and to UE-based services that may include a UE-based LCS Client application.

Node B (105)

The Node B 105 is the function within the UMTS network that provides the physical radio link between the UE 100 (User Equipment) and the land-side network. Along with the transmission and reception of data across the radio interface the Node B also applies the codes that are necessary to describe channels in a W-CDMA system. The Node B supplies timing information to UEs 100 over the Uu 105 interface. The Node B access the Uu interface via wired antenna feeds 104.

The UTRAN (UMTS Terrestrial Radio Access Network) comprises one or more RNS (Radio Network Subsystem). Each RNS comprises one or more RNC 107 and their supported Node B's 105. Each RNS control the allocation and the release of specific radio resources to establish a connection between a UE 100 and the UTRAN. A RNS is responsible for the resources and transmission/reception in a group of cells.

S-RNC (107)

When a RNC 107 (Radio Network Controller) has a logical RRC (Radio Resource Control) connection with a UE (User Equipment) via the Node B 105, it is known as the S-RNC 107 for that UE 100. The S-RNC 107 is responsible for the user's mobility within the UTRAN network and is also the point of connection towards the CN (Core Network) 112. The S-RNC 107 connects to the Node B via the 3GPP standardized Iub interface 106.

D-RNC (108)

When a UE 100 (User Equipment) in the connected state is handed onto a cell associated with a different RNC it is said to have drifted. The RRC (Radio Resource Control) connection however still terminates with the S-RNC 107. In effect the D-RNC 108 acts as a switch, routing information between the S-RNC 107 and the UE 100.

C-RNC

The Controlling Radio Network Controller is the RNC (Radio Network Controller) responsible for the configuration of a Node B. A UE (User Equipment) accessing the system will send an access to a Node B, which in turn will forward this message onto its CRNC. The C-RNC is nominally the S-RNC.

Core Network (112)

The Core Network 112 provides the functions of mobility management, exchange services for call connection control signaling between the user equipment (UE) and external networks, and interworking functions between the UTRAN radio access network and external packet and switched circuit networks. The Core Network also provides billing functionality, security and access control management with external networks.

LMU (114)

The Location Measurement Unit (LMU) makes radio measurements to support positioning of UE. The LMU may be an overlay addition to the UMTS network or may be integrated into the hardware and software of the Node B. In the present example, the LMU receives the Um radio interface for development of TDOA and/or TDOA/AoA calculated location and velocity estimates. The LMU connects to cell site antenna or to the Node B via a radio coupler to the antenna feed 113.

Examples of a U-TDOA and U-TDOA/AOA LMU have been previously described in U.S. Pat. No. 6,184,829, Calibration for a Wireless Location System; U.S. Pat. No. 6,266,013, Architecture for a Signal Collection System in a Wireless Location System; and U.S. Pat. No. 6,108,555, Enhanced Time Difference Localization System, all owned by TruePosition and incorporated herein by reference.

SMLC (116)

The SMLC 116 is a logical functional entity implemented either a separate network element (or distributed cluster of elements) or integrated functionality in the RNC 107. The SMLC 116 contains the functionality required to support Location Based Services. The SMLC 113 is the logical entity that provides the bridge between the wireless network and the location network (LMU 114, SMLC 116, and GMLC 119) by possessing data concerning the geographical area as well as the radio network topology. The SMLC 116 manages the overall co-ordination and scheduling of LMU 114 resources required for the location of a mobile. It also calculates the final location, velocity, and altitude estimates and estimates the achieved accuracy for each. In the present example, the SMLC 116 controls and interconnects a set of LMUs via packet data connections 115 for the purpose of obtaining radio interface measurements to locate or help locate UE 100 in the geographical area that its LMUs serve. The SMLC 116 contains U-TDOA, AoA and multipath mitigation algorithms for computing location, confidence interval, speed, altitude, and direction of travel. The SMLC 116 can also determine which wireless phones to locate based upon triggering from the Link Monitoring System (LMS) 124 or requests from the 3GPP standardized Iupc interface 117 to an infrastructure vendor's Radio Network Controller (RNC) Station Controller 107.

GMLC (119)

The Gateway Mobile Location Center (GMLC) 119 is defined by 3GPP standards as the clearinghouse for location records in a GSM/GPRS/UMTS network. The GMLC 119 serves as a buffer between the tightly controlled SS7 network (the GSM-MAP and CAP networks) and the unsecure packet data networks such as the Internet. Authentication, access control, accounting, and authorization functions for location-based services are commonly resident on or controlled by the GMLC 119. A Gateway Mobile Location Center (GMLC) is a server that contains the functionality required to support LBS services as well the interworking, access control, authentication, subscriber profiles, security, administration, and accounting/billing functions. The GMLC also has the ability to access the GSM-MAP and CAP networks to discover subscriber identity, request and receive routing information, obtain low-accuracy UE location, and to exert call control based on UE location. In any UMTS network, there may be multiple GMLCs.

Network LCS Client (122)

A Network LCS Client 112 is the logical functional entity that makes a request to the PLMN LCS server for the location information of one or more than one target UEs. In the UTMS network depicted in FIG. 1, the LCS server is implemented as software and data on the GMLC 119 platform. This inclusion of the LCS server with the GMLC 119 is typical for deployed systems. An LCS server comprises a number of location service components and bearers needed to serve the LCS clients. The LCS server shall provide a platform which will enable the support of location based services in parallel to other telecommunication services such as speech, data, messaging, other teleservices, user applications and supplementary services. The Network LCS client uses the Le interface 121 to access the GMLC. The network LCS client can communicate with the GMLC-based LCS server 119 to request the immediate, periodic or deferred location information for one or more target UEs within a specified set of location-related quality of service parameters if allowed by the security and privacy protections provided by the GMLC-based LCS server 119

Mobile LCS Client

The Mobile LCS Client is a software application residing in the ME 101 of the UE 100 using the USIM 102 for non-volatile or portable data storage. The mobile LCS Client may obtain location information via the GMLC 119 using the Le Interface 121 over a wireless data connection.

LMS

The LMS 133 provides passive monitoring of UMTS network interfaces such as the Iub, Iur, Iu-CS and Iu-PS by means of passive probes (not pictured) reporting to a central server or server cluster. By monitoring these interfaces, the LMS 133 may develop tasking and triggering information allowing the SMLC 116 to provide autonomous, low-latency location estimates for pre-provisioned LBS applications. LMS 133 developed triggering and tasking information is delivered to the SMLC 116 via a generic data connection 123, normally TCP/IP based. The LMS 133 is a modification to the Abis Monitoring System (AMS) described in U.S. Pat. No. 6,782,264, "Monitoring of Call Information in a Wireless Location System" and later expanded in U.S. patent application Ser. No. 11/150,414, "Advanced Triggers for Location Based Service Applications in a Wireless Location System," both incorporated herein by reference. The LMS 133 may be incorporated as software into the Node B 105 or RNC 107, 108 nodes of the UMTS system or deployed as an overlay network of passive probes.

Interfaces

The Uu interface 103 is the UMTS Air Interface as defined by 3GPP. This radio interface between the UTRAN (UMTS Terrestrial Radio Access Network) and the UE (User Equipment) utilizes W-CDMA and either Frequency Division Duplexing (FDD) or Time Division Duplexing (TDD). The UMTS radio interface is well described in 3GPP technical specifications 25.201 and 45.201, both entitled; "*Physical layer on the radio path; General description*". Specifics of the Uu radio interface as implemented in an FDD W-CDMA radio system are described in 3GPP Technical Specification 25.213, "*Spreading and modulation (FDD)*". Details and descriptions of the physical and logical channels used in a FDD W-CDMA UMTS are located in 3GPP Technical Specification 25.211, "*Physical channels and mapping of transport channels onto physical channels (FDD)*".

The Iub interface 106 is located in a UMTS radio network and is found between the RNC (Radio Network Controller) 107 and the NodeB 105. The Iub interface is as defined in 3GPP TS 25.430, "*UTRAN Iub Interface: general aspects and principles*".

The Iur 109 interconnects the UMTS Server or core RNC 70 with the Drift RNC 108 in the UMTS network. The Iur interface is standardized in 3GPP Technical Specification 25.420, "UTRAN Iur Interface: General Aspects and Principles"

The Iu-CS (Circuit Switched) interface 110 connects the UMTS RNC 107 with the circuit switched communications oriented portion of the Core Network 112.

The Iu-PS (Packet Switched) interface 111 connects the UMTS RNC 107 with the packet switched communications oriented portion of the Core Network 112.

The Iupc 117 interconnects the UMTS RNC 70 with the SMLC (also called the SAS) in the UMTS network for location estimation generation. The Iupc interface is introduced in 3GPP Technical Specification 25.450, "UTRAN Iupc interface general aspects and principles".

The E5+ interface 118 is a modification of the E5 interface defined in the Joint ANSI/ETSI Standard 036 for North American E9-1-1. The E5+ interface 118 connects the SMLC 116 and GMLC 119 nodes directly, allowing for push operations when LMS 114 triggers are used by the wireless location system with either network acquired information (cell-ID, NMR, TA, etc) or via TDOA and/or AoA (angle of arrival) performed by the LMU's 114 specialized receivers.

The Le interface 121 is an IP-based XML interface originally developed by the Location Interoperability Forum (LIF) and then later standardized by the 3rd Generation Partnership Program (3GPP) for GSM (GERAN) and UMTS (UTRAN). The Location-based services (LBS) client 122 is also known as a LCS (Location Services). The LBS and LCS services resident on the LCS Client 122 are software applications, data stores, and services uniquely enabled to use the location of a mobile device.

Mid-Call Synchronization for U-TDOA & AOA Location

Figure 2:
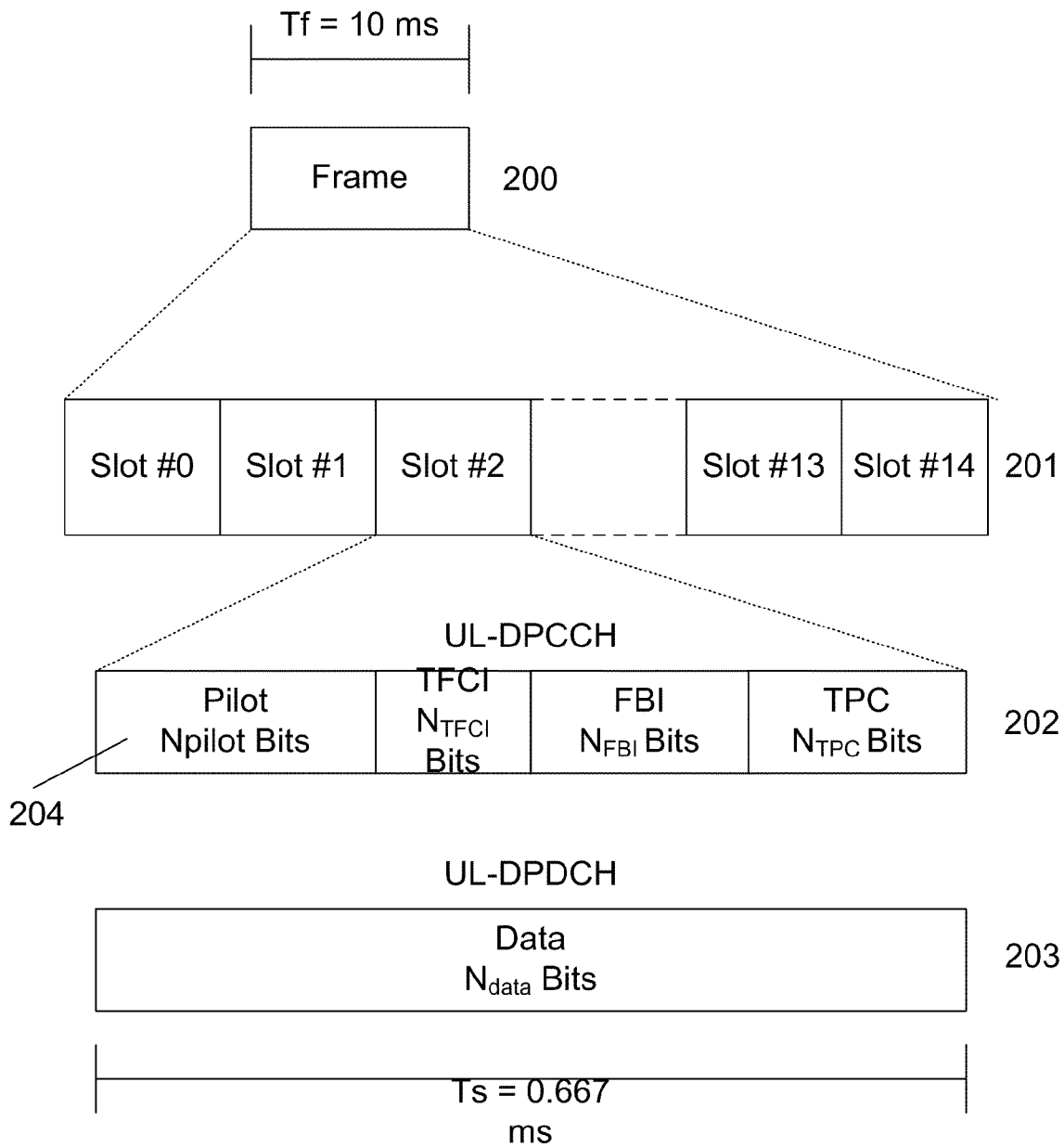
FIG. 2 depicts the frame and slot structure for UMTS W-CDMA uplink channels of interest.

FIG. 2 shows the arrangement of frame 200 and slots 201 used in the UMTS Uu radio interface for transmission of the uplink Dedicated Physical Control Channel (DPCCH) 202 and Dedicated Physical Data Channel (DPDCH) 203. The UE originating data transmitted within the DPCCH 202 and DPCH 203 are bit streams that are I/Q multiplexed prior to scrambling, spreading and transmission from the UE.

The uplink DPCCH 202 (also abbreviated as UL-DPCCH) is used to carry the DCH (Dedicated Channel) transport channel. The uplink DPCCH 202 is also used to carry control information generated at the physical layer (Layer 1). It is the DPCCH 202 that carries the 3-8 pilot bits 204 per slot that are used by the multi-frame, multi-slot synchronization operation.

The DPDCH 203 (also abbreviated as UL-DPDCH) is UMTS uplink dedicated physical channel. The uplink DPDCH 203 is used to carry the DCH (Dedicated Channel) transport channel. There may be zero, one, or several uplink DPDCH 203 on each radio link depending on data throughput and quality of service requirements.

As is well-known to those skilled in the art, in the UMTS system, in the DPCCH channel, the spreading factor is always set to 256. Thus, each data bit results in 256 chips. If no bits are known, then for each bit period, a 256-chip sequence representing a possible '0', and another 256 chip sequence representing a '1', can be correlated. This can then be done for N different bits, which then leaves $2^N$ possible combinations of bits, from which the correct one is chosen. This process is very computationally intensive and provides limited coherent processing gain. While techniques using massively parallel, spreading tree correlators are possible, a simpler and currently more economical method exists.

Nominal Case: WLS Given Pilot Sequences

In the nominal case, the RNC using the Iupc interface or LMS via its data link to the SMLC would provide the WLS with details of the UE to be located including physical radio channel related information. Where the WLS has been given the frame, slot and pilot sequences (or simply the $N_{pilot}$ bit count for the slots of interest), and N consecutive bits are known (the pilot sequence), then 256*N consecutive chips can be used to perform a coherent correlation over the N bit periods. This significantly reduces the required processing, since multiple bit possibilities do not need to be considered, and, more importantly, provides an additional 10*Log(N) dB of processing gain, and eliminates the need for the correct bit sequence selection (and loss of sensitivity resulting from multiple possibilities).

WLS not Given Pilot Sequences

In the case where the WLS has not been given the pilot sequences, the technique based on the common pilot pattern of three bits may be used. As shown in FIG. 3 (see Tables 3 and 4), the bit pattern "1-1-1" in slots 0, 5, 6, and 9 (indicated by arrows) does not change regardless of the number of Pilot Bits used per slot. With 3 consecutive bits known for the 4 slots, then 768 (256*4) consecutive chips can be used to perform a coherent correlation over the 3-bit periods. This coherent detection provides an additional 10*Log(3) dB of processing gain, and eliminates or avoids the need for a priori knowledge of the pilot bit sequences. Since the 3-bit sequence occurs in slots 0, 5, 6, and 9 within the 10 ms frame, the pattern detection allows for computation of both frame start and slot start.

Once the LMU has been tasked and the timing alignment developed, the LMU may collect the radio signal for U-TDOA location estimation and FDOA speed and heading estimation as described, e.g., in U.S. Pat. No. 5,327,144, Jul. 5, 1994, "Cellular Telephone Location System"; and U.S. Pat. No. 6,047,192, Apr. 4, 2000, "Robust Efficient Localization System," both of which are hereby incorporated by reference. U-TDOA is a standardized UMTS location technology, please see 3GPP TS 25.305, "*Stage 2 functional specification of User Equipment (UE) positioning in UTRAN*" and 3GPP TS 22.071, "*Location Services (LCS); Service description; Stage 1*".

FIG. 3 includes a modification to Table 3, "Pilot bit patterns for uplink DPCCH with $N_{pilot}$=3, 4, 5, 6", of the 3GPP specification 3GPP TS 25.211 section 5.2.1.1. FIG. 3 also includes a modification to Table 4, "Pilot bit patterns for uplink DPCCH with $N_{pilot}$=7 and 8", of the 3GPP specification 3GPP TS 25.211 section 5.2.1.1. These tables together show the pilot bit pattern for each slot of the uplink DPCCH for all allowed values of the number of pilot bits ($N_{pilot}$). In the case where the number of pilot bits ($N_{pilot}$) is known by the WLS, the full pilot sequence can be used in the determination of frame and slot position. Where the number of pilot bits ($N_{pilot}$) is not known, the first three bits of slots 0, 5, 6, and 9 can still be used for the determination of frame and slot position.

Figure 4:
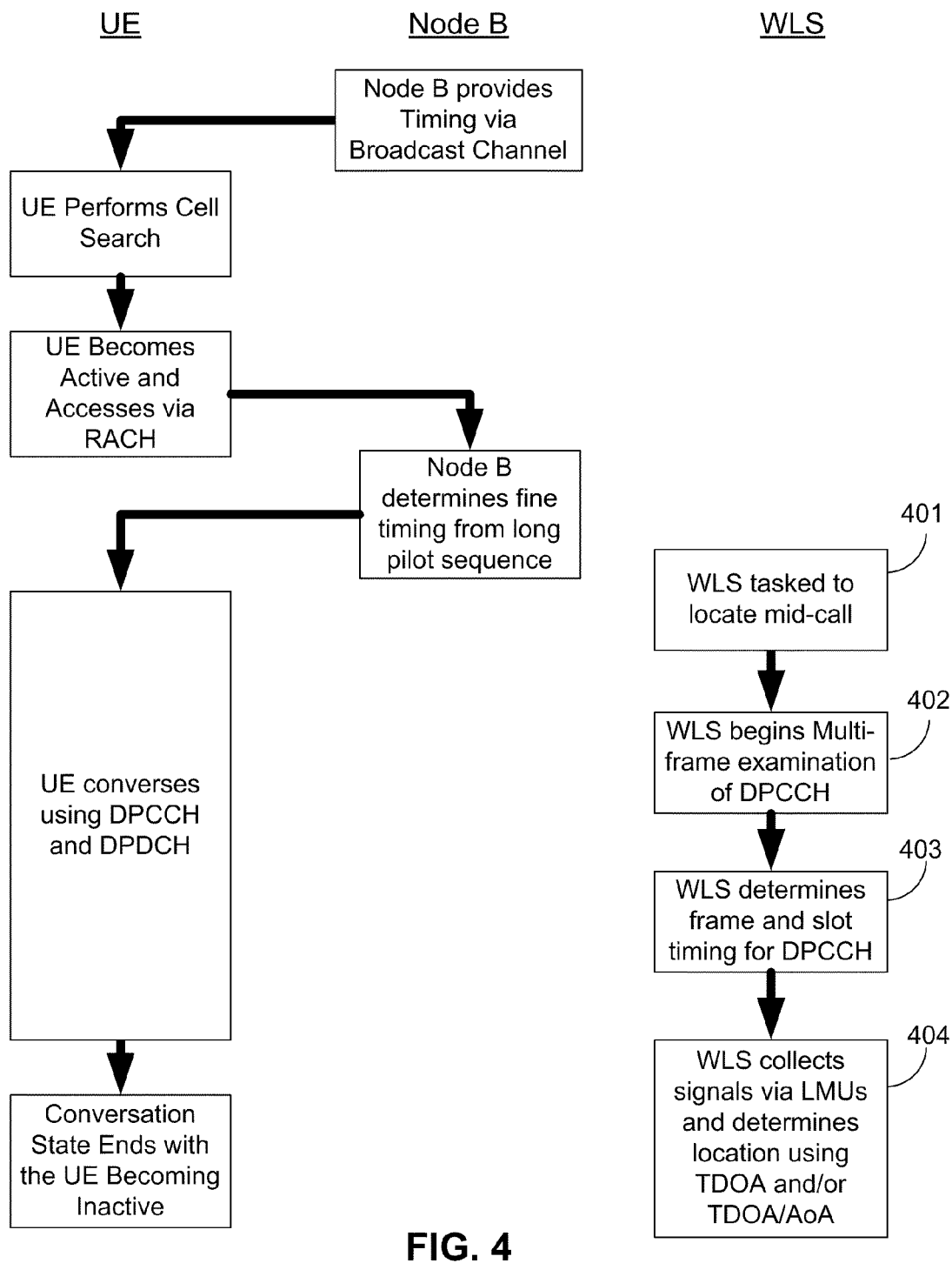
FIG. 4 illustrates the process where radio signals are monitored and time alignment is obtained.

FIG. 4 shows a procedure that may be used by the UMTS network to establish synchronization with the UE prior to entering the active or conversation state. The present invention may be used by an overlay WLS when the UE is transmitting in the uplink direction, providing the DPCCH for analysis. As shown, in this example, once the time alignment is developed and the frame start and slot start times are known, the WLS's LMU collects the UMTS radio signal for U-TDOA or U-TDOA/AoA location estimation. In this example, the WLS performs the steps denoted 401, 402, 403 and 404, i.e., it receives a tasked to locate a particular UE device assigned to a DPCCH, performs a multi-frame examination of the DPCCH, and then determines frame and slot timing for the DPCCH. The frame and slot timing information permits the WLS, through its LMUs, to collect uplink signals that can be used in location processing, using known U-TDOA and/or AoA methods. The location estimate can include the latitude, longitude, and altitude of the UE. The location estimation processing uses frequency-difference-of-arrival to produce a speed and heading estimate. The WLS can optionally include error estimates or confidence values for each produced datum (location, altitude, speed, and heading).

CONCLUSION

The true scope the present invention is not limited to the presently preferred embodiments disclosed herein. For example, the foregoing disclosure of a presently preferred embodiment of a Wireless Location System uses explanatory terms, such as Location Measurement Unit (LMU, Serving Mobile Location Center (SMLC), and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA techniques. For example, the invention is not limited to systems employing LMU's constructed and deployed as described above. The LMU's and SMLC's, etc. are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the LMU) described herein to another functional element within the wireless communications network (such as the BS or base station) without changing the inventive operation of the system. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

What is claimed:

1. In a wireless location system (WLS) for use in locating a mobile transmitter, a method for determining frame and slot timing information for use in receiving an uplink signal from a user equipment device (UE) assigned to an uplink Dedicated Physical Control Channel (DPCCH), comprising:

receiving uplink DPCCH signals in the uplink DPCCH at a location measurement unit (LMU) of the WLS, said uplink DPCCH signals being formatted into multiple frames and multiple slots per frame;

detecting a predefined bit pattern known to be present in a plurality of predefined slots of the uplink DPCCH signals;

examining the DPCCH signals across multiple frames;

determining the frame and slot timing information for the uplink DPCCH based on the detected bit pattern; and using the frame and slot timing information, collecting uplink signals from the UE for use in location processing.

2. A method as recited in claim 1, wherein the step of collecting uplink signals from the UE comprises collecting uplink signals at a plurality of LMUs and using said signals in time difference of arrival (TDOA) processing to determine the location of the UE.

3. A method as recited in claim 2, wherein said predefined bit pattern comprises the bit pattern "1-1-1".

4. A method as recited in claim 3, wherein said predefined slots comprise slots 0, 5, 6, and 9 of a 10 millisecond (ms) frame.

5. A method as recited in claim 4, wherein the WLS is overlaid on a UMTS (Universal Mobile Telephone System) wireless communications system, and wherein the UE to be located comprises a wireless device communicating with said UMTS wireless communications system.

6. A wireless location system (WLS) for use in locating a mobile transmitter, comprising:

a network of location measurement units (LMUs); and a processor configured to cause the system to determine frame and slot timing information for use in receiving an uplink signal from a user equipment device (UE) assigned to an uplink Dedicated Physical Control Channel (DPCCH), including receiving signals in the uplink DPCCH at a first LMU, said signals being formatted into multiple frames and multiple slots per frame; detecting a predefined bit pattern known to be present in a plurality of predefined slots of the uplink DPCCH; examining the signals across multiple frames; determining the frame and slot timing information for the uplink DPCCH based on the detected bit pattern; and using the frame and slot timing information to collect uplink signals from the UE for use in location processing.

7. A system as recited in claim 6, wherein the system is further configured to collect uplink signals at a plurality of LMUs and use said signals in time difference of arrival (TDOA) processing to determine the location of the UE.

8. A system as recited in claim 7, wherein said predefined bit pattern comprises the bit pattern "1-1-1".

9. A system as recited in claim 8, wherein said predefined slots comprise slots 0, 5, 6, and 9 of a 10 millisecond (ms) frame.

10. A system as recited in claim 9, wherein the WLS is overlaid on a Universal Mobile Telephone System (UMTS) wireless communications system, and wherein the UE to be located comprises a wireless device communicating with said UMTS wireless communications system.

11. A method as recited in claim 5 wherein said frame and slot timing information includes a start time for each frame and slot.

12. A system as recited in claim 6 wherein said frame and slot timing information includes a start time for each frame and slot.

13. A method for use by a wireless location system (WLS) in locating a user equipment device (UE) communicating via a wireless communications system configured in accordance with Universal Mobile Telephone System (UMTS) technical specifications, comprising:

receiving a task to locate said UE mid-call, wherein said task is received following a process in which a Node B element of the UMTS provides timing information via a broadcast channel; said UE performs a cell search and accesses the UMTS via a reverse access channel (RACH); the Node B element determines fine timing information from a long pilot sequence; and the UE converses with the UMTS using a Dedicated Physical Control Channel (DPCCH) and a Dedicated Physical Data Channel (DPDCH);

receiving uplink DPCCH signals from said UE;

detecting a predefined bit pattern known to be present in a plurality of predefined slots of the uplink DPCCH signals;

performing a multi-frame examination of the DPCCH signals;

determining frame and slot timing information for the DPCCH based on the detected bit pattern, wherein said frame and slot timing information includes a start time for each frame and slot;

collecting uplink signals from said UE via a network of location measurement units (LMUs); and determining the location of said UE using the uplink signals collected by said LMUs.

14. A method as recited in claim 13 wherein the step of collecting uplink signals from the UE comprises collecting uplink signals at a plurality of LMUs, and wherein said signals are used in time difference of arrival (TDOA) processing to determine the location of the UE.

15. A method as recited in claim 14 wherein said predefined bit pattern comprises the bit pattern "1-1-1".

16. A method as recited in claim 15 wherein said predefined slots comprise slots 0, 5, 6, and 9 of a 10 millisecond (ms) frame.

17. A method as recited in claim 16 wherein the WLS is overlaid on a UMTS wireless communications system, and wherein the UE to be located comprises a wireless device communicating with said UMTS wireless communications system.

18. A wireless location system (WLS) for use in locating a user equipment device (UE) communicating via a wireless communications system configured in accordance with Universal Mobile Telephone System (UMTS) technical specifications, comprising:

a network of location measurement units (LMUs); and a processor configured to cause the system to:

receive a task to locate said UE mid-call, wherein said task is received following a process in which a Node B element of the UMTS provides timing information via a broadcast channel; said UE performs a cell search and accesses the UMTS via a reverse access channel (RACH); the Node B element determines fine timing information from a long pilot sequence; and the UE converses with the UMTS using a Dedicated Physical Control Channel (DPCCH) and a Dedicated Physical Data Channel (DPDCH);

receive uplink DPCCH signals from said UE;

detect a predefined bit pattern known to be present in a plurality of predefined slots of the uplink DPCCH signals;

perform a multi-frame examination of the DPCCH signals;

determine frame and slot timing information for the DPCCH based on the detected bit pattern, wherein said frame and slot timing information includes a start time for each frame and slot;

collect uplink signals from said UE via the network of LMUs; and determine the location of said UE using the uplink signals collected by said LMUs.

19. A WLS as recited in claim 18 wherein the processor is further configured to collect uplink signals from the UE by collecting uplink signals at a plurality of LMUs, and to use said signals in time difference of arrival (TDOA) processing to determine the location of the UE.

20. A WLS as recited in claim 18 wherein said predefined bit pattern comprises the bit pattern "1-1-1".

21. A WLS as recited in claim 18 wherein said predefined slots comprise one or more of slots 0, 5, 6, and 9 of a 10 millisecond (ms) frame.

22. A WLS as recited in claim 18 wherein the WLS is overlaid on a UMTS wireless communications system, and wherein the UE to be located comprises a wireless device communicating with said UMTS wireless communications system.

* * * * *